United States Patent
Hong et al.

(10) Patent No.: US 10,747,076 B2
(45) Date of Patent: Aug. 18, 2020

(54) DISPLAY PANEL, METHOD FOR MAKING THE SAME AND METHOD FOR CONTROLLING THE SAME

(71) Applicant: Wuhan China Star Optoelectronics Technology Co., Ltd., Wuhan, Hubei (CN)

(72) Inventors: Guanghui Hong, Hubei (CN); Qiang Gong, Hubei (CN)

(73) Assignee: WUHAN CHINA STAR OPTOELECTRONICS TECHNOLOGY CO., LTD., Wuhan (CN)

(*) Notice: Subject to any disclaimer, the term of this patent is extended or adjusted under 35 U.S.C. 154(b) by 343 days.

(21) Appl. No.: 15/751,945

(22) PCT Filed: Jan. 2, 2018

(86) PCT No.: PCT/CN2018/070019
§ 371 (c)(1),
(2) Date: Feb. 12, 2018

(87) PCT Pub. No.: WO2019/104822
PCT Pub. Date: Jun. 6, 2019

(65) Prior Publication Data
US 2020/0133084 A1    Apr. 30, 2020

(30) Foreign Application Priority Data
Nov. 29, 2017  (CN) .......................... 2017 1 1230619

(51) Int. Cl.
G09G 3/36    (2006.01)
G02F 1/1362  (2006.01)

(52) U.S. Cl.
CPC ..... *G02F 1/136286* (2013.01); *G09G 3/3648* (2013.01); *G09G 3/3688* (2013.01); *G02F 2201/123* (2013.01)

(58) Field of Classification Search
CPC ........ G02F 1/136286; G02F 2201/123; G09G 3/3688; G09G 3/3648
See application file for complete search history.

(56) References Cited

U.S. PATENT DOCUMENTS 10,048,557 B1*   8/2018  An ........................ G02F 1/1368
2005/0083319 A1* 4/2005  Kodate ................ G09G 3/3659
                                                          345/204

(Continued)

FOREIGN PATENT DOCUMENTS

CN    105116659 A    12/2015

*Primary Examiner* — Ibrahim A Khan
(74) *Attorney, Agent, or Firm* — Hemisphere Law, PLLC; Zhigang Ma

(57) ABSTRACT

The disclosure provides a display panel, a method for making the display panel, and a method for controlling the display panel. The display panel comprises: multiple gate lines and multiple data line crossing the multiple gate lines to form multiple pixel regions; multiple pixel electrodes in the multiple pixel regions; multiple first thin film transistors in the multiple pixel regions, the gates of the multiple first thin film transistors are connected to the gate lines, and the sources and the drains are connected to the data lines and the pixel electrodes respectively; and a second thin film transistor between and connecting two adjacent pixel electrodes, wherein the second thin film transistor is in a non-conducting state when the display panel is under normal operation, and the second thin film transistor is in a conducting state when the display panel is under a power failure condition.

10 Claims, 4 Drawing Sheets

(56) References Cited

U.S. PATENT DOCUMENTS

2009/0015744 A1* 1/2009 Sekine ................. G09G 3/3659
                                                      349/39
2010/0033419 A1   2/2010 Lin
2018/0226009 A1*  8/2018 Lin ....................... G09G 3/2003
2019/0096336 A1*  3/2019 Lee ...................... H01L 27/3244

* cited by examiner

FIG. 1

FIG. 2

DISPLAY PANEL, METHOD FOR MAKING THE SAME AND METHOD FOR CONTROLLING THE SAME

RELATED APPLICATIONS

The present application is a National Phase of International Application Number PCT/CN2018/070019, filed Jan. 2, 2018, and claims the priority of China Application No. 201711230619.1, filed Nov. 29, 2017.

FIELD OF THE DISCLOSURE

The disclosure relates to a display technical field, and more particularly to a display panel, a method for making the display panel, and a method for controlling the display panel.

BACKGROUND

The active area is an effective area of the whole display panel. The active area typically comprises gate lines for sequentially scanning, data lines for providing voltage for pixels, pixel electrodes for rotating liquid crystal, and pixels each comprising an n-type thin film transistor as a switching element. The pixels of the active area are arranged in arrays to from repeating units to present information.

It is well know that the rotation of liquid crystal in the pixels of the display panel is driven by polarity inversion to prevent the residual direct current voltage, which affects the quality and the display function of the display panel. Dot inversion and line inversion are two common inversion types of sub pixels. FIG. 1 and FIG. 2 respectively show two inversion types of the sub pixels commonly used in the display. One of them is line inversion, and the other one is dot inversion. FIG. 1 is a structural schematic view of pixels with a line inversion mode commonly used in a display panel, wherein the symbol "+" indicates the pixel is driven by positive charges, and the symbol "−" indicates the pixel is driven by negative charges. Under line inversion mode, if a line of pixels in a frame are driven by the positive charges, the adjacent pixels are driven by the negative charges. Likewise, if a line of pixels are driven by the negative charges, the adjacent pixels are driven by the positive charges. FIG. 2 is a structural schematic view of is a structural schematic view of pixels with a dot inversion mode commonly used in a display panel. Under dot inversion mode, if a pixel in a frame is driven by the positive charges, the adjacent pixels are driven by the negative charges. Likewise, if a pixel is driven by the negative charges, the adjacent pixels are driven by the positive charges.

If the display panel shuts down unexpectedly, there is no ways to release the charges when the pixels are driven by the ways as mentioned above. As a result, the charges residue in the pixels. FIG. 3 is a structural schematic view of the status of the charges when the display panel comprising pixels with a line inversion mode shuts down unexpectedly. In the line inversion driving mode, the residual charges in the two adjacent lines of pixels are different. In the dot inversion driving mode, the residual charges in the two adjacent pixels are different. The difference of the residual charges in the pixels will lead to grey flickering when the display panel restarts and thus affect the quality of the display panel.

SUMMARY

A technical problem to be solved by the disclosure is to provide a display panel, a method for making the same and a method for controlling the same to alleviate the problem of grey flickering due to residual charges caused by the sudden power failure. Accordingly, the display panel is with improved quality.

To solve the technical problem as mentioned above, the present disclosure provides a display panel, comprising: multiple gate lines and multiple data line crossing the multiple gate lines to form multiple pixel regions; multiple pixel electrodes in the multiple pixel regions; multiple first thin film transistors in the multiple pixel regions, wherein each of the multiple first thin film transistors comprises a gate, source and a drain, the gates of multiple first thin film transistors are connected to the gate lines, and the sources and the drains are connected to the data lines and the pixel electrodes respectively; and a second thin film transistor between and connecting two adjacent pixel electrodes, wherein the second thin film transistor is in a non-conducting state when the display panel is under normal operation, and the second thin film transistor is in a conducting state when the display panel is under a power failure condition.

In an embodiment, the display panel further comprises a global signal line between two adjacent gate lines, wherein the second thin film transistor comprises a gate connected to the global signal line, and the second thin film transistor further comprises a source and a drain connected to the two pixel electrodes adjacent to the second thin film transistor respectively.

In an embodiment, when the display panel is under normal operation, the voltage that the global signal line applied to the gate of the second thin film transistor is VGL (voltage gate low). When the display panel is under a power failure condition, the voltage that the global signal line applied to the gate of the second thin film transistor is VGH (voltage gate high) and maintains for a period of time.

In an embodiment, after the voltage that the global signal line applied to the gate of the second thin film transistor is voltage gate high and maintains for a period of time, each of the pixel regions in the display panel is at the lower positive potential with the same charge amount, at the lower negative potential with the same charge amount or at the same ground potential (GND).

In an embodiment, the second thin film transistor is an n-type thin film transistor.

According to another aspect of the disclosure, the present disclosure also provides a method for making a display panel, comprising: disposing multiple gate lines and multiple data line on a substrate, wherein the multiple data line cross the multiple gate lines to form multiple pixel regions; disposing multiple first thin film transistors and multiple pixel electrodes in the multiple pixel regions, wherein each of the multiple first thin film transistors comprises a gate, source and a drain, connecting the gates of multiple first thin film transistors to the gate lines, and connecting the sources and the drains of the multiple first thin film transistor to the gate lines and the data lines respectively; disposing a second thin film transistor between two adjacent pixel electrodes, wherein the second thin film transistor is in a non-conducting state when the display panel is under normal operation, and the second thin film transistor is in a conducting state when the display panel is under a power failure condition.

In an embodiment, the method further comprises disposing a global signal line between two adjacent gate lines, connecting the gate of the second thin film transistor to the global signal line, connecting the source and the drain of the second thin film transistor the two pixel electrodes adjacent to the second thin film transistor respectively.

According to another aspect of the disclosure, the present disclosure also provides a method for controlling the display panel. The display panel comprises multiple gate lines and multiple data line crossing the multiple gate lines to form multiple pixel regions; multiple pixel electrodes in the multiple pixel regions; multiple first thin film transistors in the multiple pixel regions, wherein each of the multiple first thin film transistors comprises a gate, source and a drain, the gates of multiple first thin film transistors are connected to the gate lines, and the sources and the drains are connected to the data lines and the pixel electrodes respectively; and a second thin film transistor between and connecting two adjacent pixel electrodes. The method for controlling the display panel comprises when the display panel is under normal operation, the second thin film transistor is in a non-conducting state; when the display panel is under a power failure condition, the second thin film transistor is in a conducting state.

In an embodiment, the display panel further comprises a global signal line between two adjacent gate lines, wherein the second thin film transistor comprises a gate connected to the global signal line, and the second thin film transistor further comprises a source and a drain connected to the two pixel electrodes adjacent to the second thin film transistor respectively. The method for controlling the display panel further comprises: when the display panel is under normal operation, the global signal line applies a voltage gate low (VGL) to the gate of the second thin film transistor. When the display panel is under a power failure condition, the global signal line applies a voltage gate high to the gate of the second thin film transistor for a period of time.

In an embodiment, after the voltage that the global signal line applied to the gate of the second thin film transistor is voltage gate high and maintains for a period of time, each of the pixel regions in the display panel is at the lower positive potential with the same charge amount, at the lower negative potential with the same charge amount or at the same ground potential (GND).

According to one of the advantages of the present disclosure, adding a second thin film transistor between two adjacent pixel electrodes in a line of pixel electrodes in the active area can release charges in the pixels when the display panel shuts down unexpectedly. Therefore, the problem of grey flickering due to residual charges caused by the sudden power failure can be alleviated. Accordingly, the display panel of the present disclosure is with improved quality.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures:

Figures 1, 2:
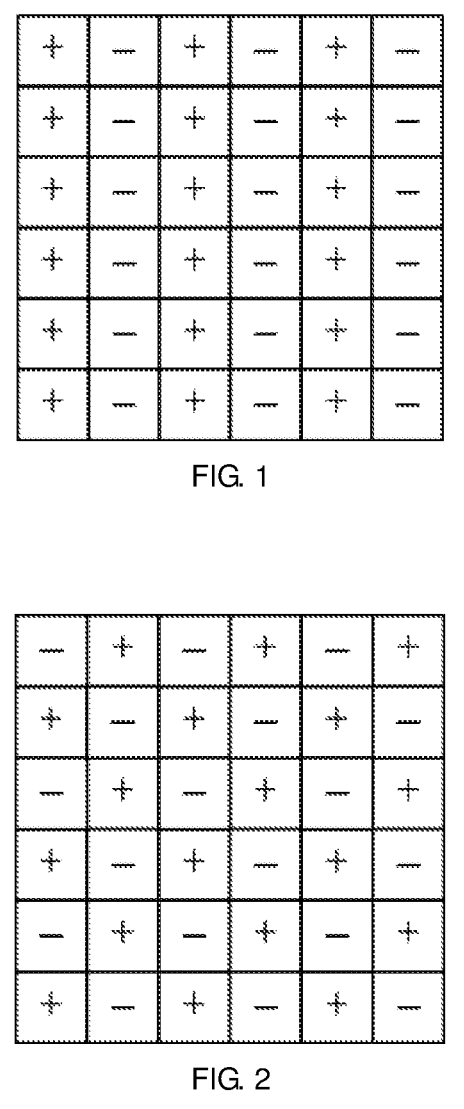

FIG. 1 is a structural schematic view of pixels with a line inversion mode commonly used in a display panel;

FIG. 2 is a structural schematic view of is a structural schematic view of pixels with a dot inversion mode commonly used in a display panel;

DETAILED DESCRIPTION OF PREFERRED EMBODIMENTS

In order to understand the above objectives, features and advantages of the present disclosure more clearly, the present disclosure is described in detail below with references to the accompanying drawings and specific embodiments.

Figure 3:
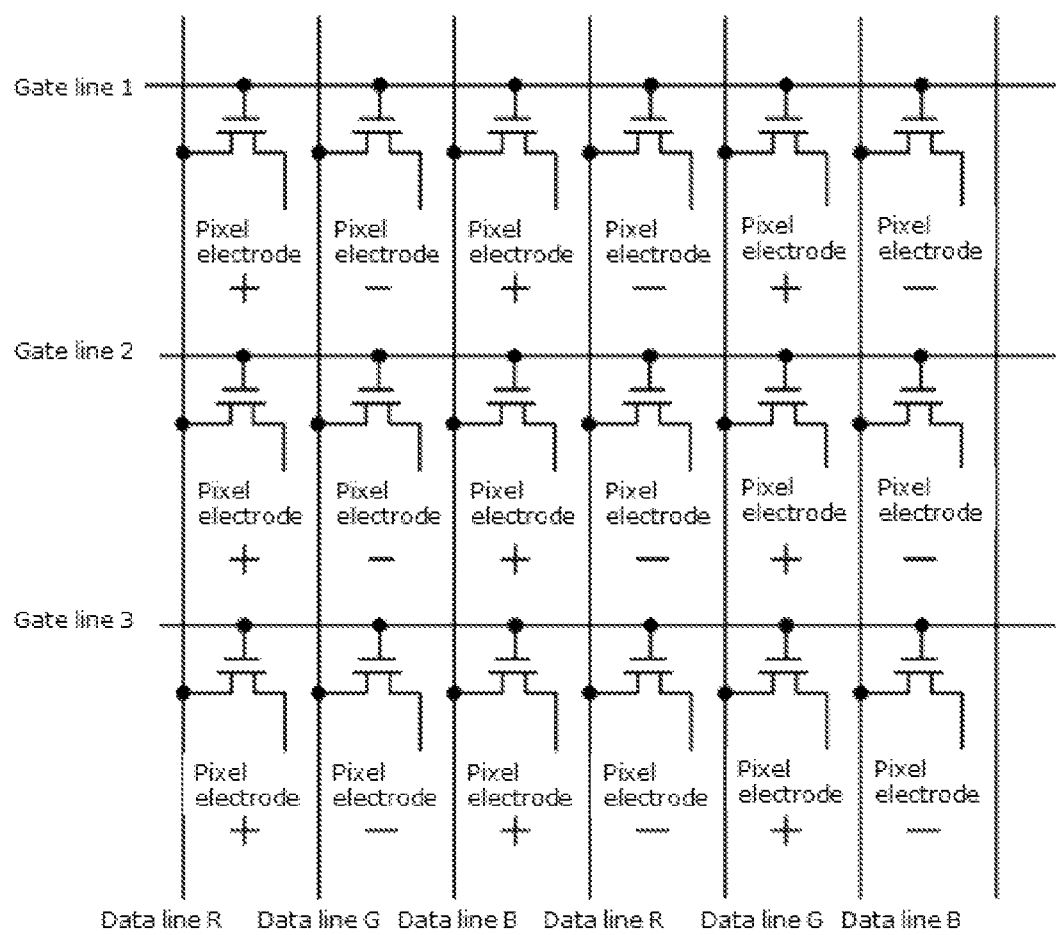
FIG. 3 is a structural schematic view of the status of the charges when the pixels with a line inversion mode shuts down unexpectedly.
Figure 4:
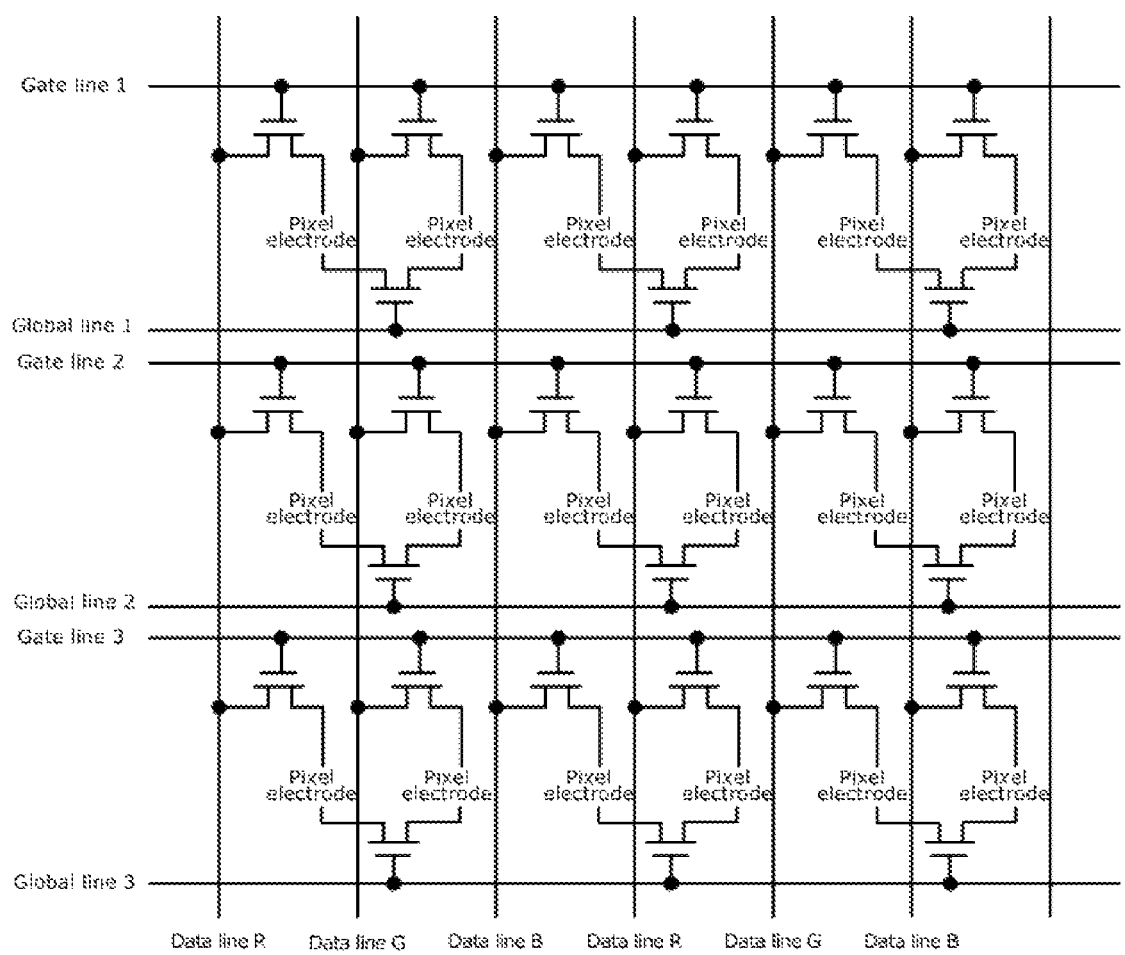
FIG. 4 is a structural schematic view of a display panel according to the first embodiment of the disclosure.

Referring to FIG. 4, the first embodiment of the disclosure provides a display panel. The display panel comprises: multiple gate lines and multiple data line crossing the multiple gate lines to form multiple pixel regions; multiple pixel electrodes in the multiple pixel regions; multiple first thin film transistors in the multiple pixel regions, wherein each of the multiple first thin film transistors comprises a gate, source and a drain, the gates of multiple first thin film transistors are connected to the gate lines, and the sources and the drains are connected to the data lines and the pixel electrodes respectively; and a second thin film transistor between and connecting two adjacent pixel electrodes.

Furthermore, the display panel of the present embodiment further comprises a global signal line between two adjacent gate lines. The second thin film transistor comprises a gate connected to the global signal line. The second thin film transistor further comprises a source and a drain connected to the two pixel electrodes adjacent to the second thin film transistor respectively.

According to the embodiment of the present disclosure, adding a second thin film transistor between two adjacent pixel electrodes in a line of pixel electrodes in the active area can release charges in the pixels when the display panel shuts down unexpectedly, wherein the second thin film transistor is controlled by the global signal line. Therefore, the problem of grey flickering due to the residual charges caused by the sudden power failure can be alleviated. Accordingly, the display panel of the present disclosure is with improved quality.

Specifically, dot inversion and line inversion are two common inversion driving modes of pixels in the display panel. Under these two driving modes, two pixels adjacent to each pixel in a line are driven by opposite charges. That is, one of the adjacent pixels is driven by the positive charges, and the other one is driven by the negative charges. There are three kinds of situations. One of them is the amount of positive charges is greater than the amount of negative charges, another one is the amount of positive charges is equal to the amount of negative charges, and the other one is the amount of positive charges is less than the amount of negative charges. In the present embodiment, the working principle of the TFT display panel is that when the display panel is under normal operation, the additional global signal line is voltage gate low (VGL), and the additional second thin film transistor is in a non-conducting state. The potentials of the two adjacent pixels do not affect each other. As a result, the additional second thin film transistor does not affect the display panel under normal operation. When the display panel shuts down unexpectedly, voltage gate high (VGH) is maintained for a period of time through the global signal line. Under this situation, the additional second thin film transistor is in a conducting state and thus the positive and negative charges cancel out to reach neutral charges since two adjacent pixels are driven by opposite charges. As a result, the pixels are at a lower potential with the same amount of charges. The problem of grey flickering caused by the residual of charges is avoided. The neutral charges result in three conditions. One of them is the pixel regions in the display panel are at the lower positive potential with the same charge amount, another one is the pixel regions are at the lower negative potential with the same charge amount, and the other one is the pixel regions are at the same ground potential (GND).

Figure 5:
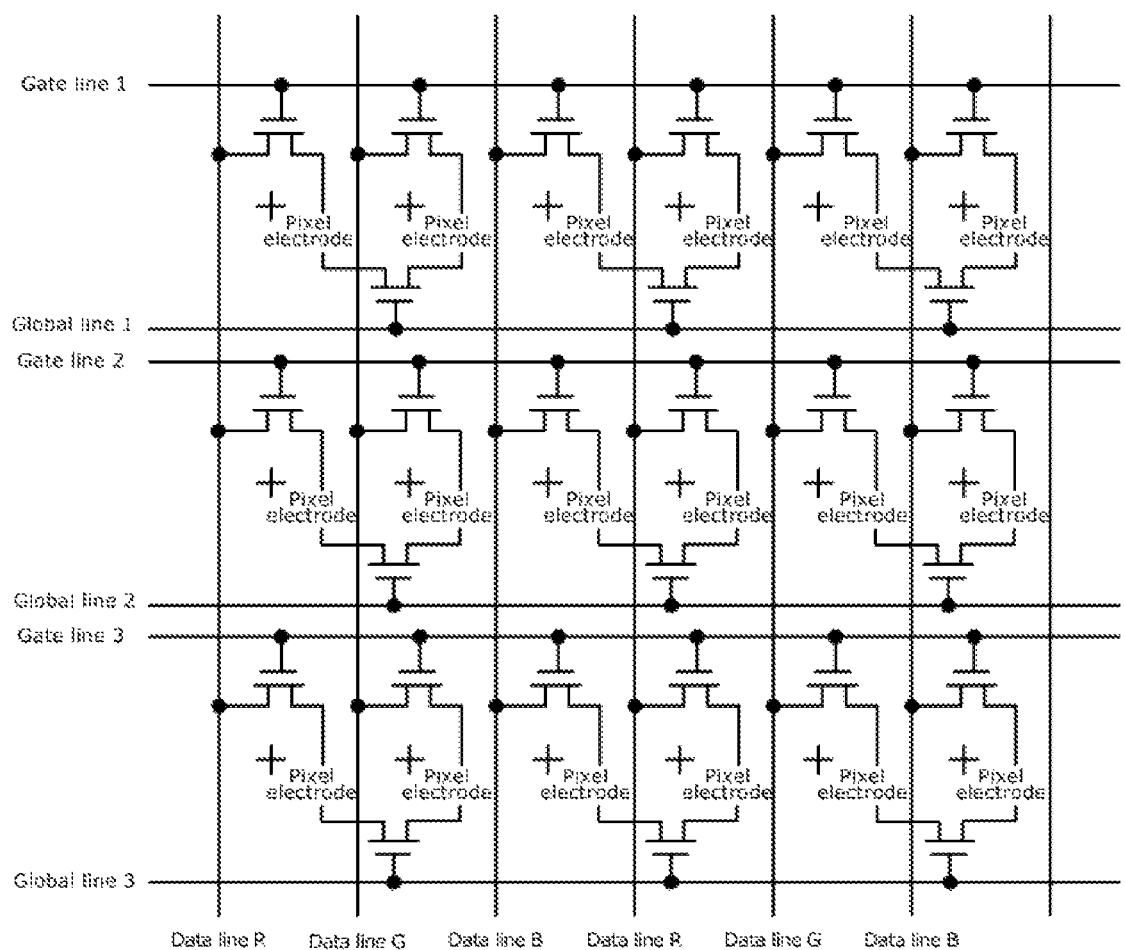
FIG. 5 is a structural schematic view of the status of the charges of the pixels in a display panel according to the first embodiment of the disclosure when the display panel shuts down unexpectedly.

As shown in FIG. 5, before power failure condition, if the amount of positive charges is greater than the amount of negative charges, after the positive and negative charges cancel out to reach neutral charges by the control of the additional second thin film transistor, the pixel regions are at the lower positive potential with the same charge amount. Similarly, before power failure condition, if the amount of positive charges is less than the amount of negative charges, after the positive and negative charges cancel out to reach neutral charges by the control of the additional second thin film transistor, the pixel regions are at the lower negative potential with the same charge amount. Before power failure condition, if the amount of positive charges is equal to the amount of negative charges, after the positive and negative charges cancel out to reach neutral charges by the control of the additional second thin film transistor, the pixel regions are at the same ground potential (GND).

Furthermore, the first thin film transistors and the second thin film transistor are n-type thin film transistors. Each of the n-type thin film transistors comprises a gate, source, and a drain. The working principle is that when the gate is at a high potential, the source and the drain are in conducting state. When the gate is at VGL, the source and the drain are in non-conducting state. Accordingly, by adding the second n-type thin film transistor and by the gate of the second n-type thin film transistor is connected to the global signal line, the source and the drain are connected to the adjacent pixel electrodes in a transverse direction. Therefore, when the display panel is under normal operation, the voltage that the global signal line applied to the gate of the second thin film transistor is voltage gate low, and the second thin film transistor is in a non-conducting state. Under this condition, the potentials of the two adjacent pixels do not affect each other. As a result, the additional second thin film transistor does not affect the display panel under normal operation. When the display panel shuts down unexpectedly, the high voltage applied to the second thin film transistor by the global signal line is maintained for a period of time. Under this situation, the additional second thin film transistor is in a conducting state and thus the positive and negative charges cancel out to reach neutral charges since two adjacent pixels are driven by opposite charges. As a result, the pixel regions are at a lower potential with the same amount of charges. Accordingly, the problem of grey flickering caused by the residual of charges is avoided.

According to the first embodiment, the second embodiment of the present disclosure provides a method for making a display panel. The method comprises disposing multiple gate lines and multiple data line on a substrate, wherein the multiple data line cross the multiple gate lines to form multiple pixel regions; disposing multiple first thin film transistors and multiple pixel electrodes in the multiple pixel regions, wherein each of the multiple first thin film transistors comprises a gate, source and a drain, connecting the gates of multiple first thin film transistors to the gate lines, and connecting the sources and the drains of the multiple first thin film transistor to the gate lines and the data lines respectively; disposing a second thin film transistor between two adjacent pixel electrodes, wherein the second thin film transistor is in a non-conducting state when the display panel is under normal operation, and is in a conducting state when the display panel is under a power failure condition.

In an embodiment, the method further comprises disposing a global signal line between two adjacent gate lines, connecting the gate of the second thin film transistor to the global signal line, connecting the source and the drain of the second thin film transistor the two pixel electrodes adjacent to the second thin film transistor respectively.

The present disclosure also provides a method for controlling the display panel. The display panel comprises multiple gate lines and multiple data line crossing the multiple gate lines to form multiple pixel regions; multiple pixel electrodes in the multiple pixel regions; multiple first thin film transistors in the multiple pixel regions, wherein each of the multiple first thin film transistors comprises a gate, source and a drain, the gates of multiple first thin film transistors are connected to the gate lines, and the sources and the drains are connected to the data lines and the pixel electrodes respectively; and a second thin film transistor between and connecting two adjacent pixel electrodes. The method for controlling the display panel comprises when the display panel is under normal operation, the second thin film transistor is in a non-conducting state; when the display panel is under a power failure condition, the second thin film transistor is in a conducting state.

In an embodiment, the display panel further comprises a global signal line between two adjacent gate lines, wherein the second thin film transistor comprises a gate connected to the global signal line, and the second thin film transistor further comprises a source and a drain connected to the two pixel electrodes adjacent to the second thin film transistor respectively. The method for controlling the display panel further comprises: when the display panel is under normal operation, the global signal line applies a voltage gate low (VGL) to the gate of the second thin film transistor. When the display panel is under a power failure condition, the global signal line applies a voltage gate high to the gate of the second thin film transistor for a period of time.

In an embodiment, after the voltage that the global signal line applied to the gate of the second thin film transistor is voltage gate high and maintains for a period of time, each of the pixel regions in the display panel is at the lower positive potential with the same charge amount, at the lower negative potential with the same charge amount or at the same ground potential (GND).

The advantages and the working principles of the method for making the display panel and the method for controlling the display panel can be referred to the first embodiment as mentioned above and thus will not be described again herein.

The foregoing contents are detailed description of the disclosure in conjunction with specific preferred embodiments and concrete embodiments of the disclosure are not limited to these description. For the person skilled in the art of the disclosure, without departing from the concept of the disclosure, simple deductions or substitutions can be made and should be included in the protection scope of the application.

What is claimed is:
1. A display panel, comprising
multiple gate lines and multiple data line crossing the multiple gate lines to form multiple pixel regions;
multiple pixel electrodes in the multiple pixel regions;

multiple first thin film transistors in the multiple pixel regions, wherein each of the multiple first thin film transistors comprises a gate, source and a drain, the gates of the multiple first thin film transistors are connected to the gate lines, and the sources and the drains are connected to the data lines and the pixel electrodes respectively; and multiple second thin film transistors, wherein each of the second thin film transistors is between and connecting two adjacent pixel electrodes, the second thin film transistor is in a non-conducting state when the display panel is under normal operation, and the second thin film transistor is in a conducting state to make the two adjacent pixel electrodes driven by opposite charges release charges through the second thin film transistor when the display panel is under a power failure condition caused by that the display panel shuts down unexpectedly.

2. The display panel according to claim 1, further comprising multiple global signal lines, wherein each of the global signal lines is between two adjacent gate lines and electrically connected with more than one of the second thin film transistors in a transverse direction, the second thin film transistor comprises a gate connected to the global signal line, the second thin film transistor further comprises a source and a drain connected to the two adjacent pixel electrodes arranged in the transverse direction and adjacent to the second thin film transistor respectively, and the second thin film transistors electrically connected with different ones of the global signal lines all are in conducting states in a period of time when the display panel is under the power failure condition.

3. The display panel according to claim 2, wherein when the display panel is under normal operation, a voltage that the global signal line applied to the gate of the second thin film transistor is VGL (voltage gate low), and when the display panel is under the power failure condition, the voltage that the global signal line applied to the gate of the second thin film transistor is VGH (voltage gate high) and maintains for the period of time.

4. The display panel according to claim 3, wherein after the voltage that the global signal line applied to the gate of the second thin film transistor is voltage gate high and maintains for the period of time, the pixel regions in the display panel are at lower positive potentials with a same charge amount, at lower negative potentials with a same charge amount, or at a same ground potential (GND).

5. The display panel according to claim 1, wherein the second thin film transistor is an n-type thin film transistor.

6. A method for making a display panel, comprising:
disposing multiple gate lines and multiple data line on a substrate, wherein the multiple data line cross the multiple gate lines to form multiple pixel regions;
disposing multiple first thin film transistors and multiple pixel electrodes in the multiple pixel regions, wherein each of the multiple first thin film transistors comprises a gate, source and a drain, connecting the gates of multiple first thin film transistors to the gate lines, and connecting the sources and the drains of the multiple first thin film transistor to the gate lines and the data lines respectively;
disposing multiple second thin film transistors, wherein each of the second thin film transistors is between two adjacent pixel electrodes, the second thin film transistor is in a non-conducting state when the display panel is under normal operation, and the second thin film transistor is in a conducting state to make the two adjacent pixel electrodes driven by opposite charges release charges through the second thin film transistor when the display panel is under a power failure condition caused by that the display panel shuts down unexpectedly.

7. The method according to claim 6, further comprising: disposing multiple global signal lines, wherein each of the global signal lines is between two adjacent gate lines and electrically connected with more than one of the second thin film transistors in a transverse direction; connecting a gate of the second thin film transistor to the global signal line, and connecting a source and a drain of the second thin film transistor to the two adjacent pixel electrodes arranged in the transverse direction and adjacent to the second thin film transistor respectively; wherein the second thin film transistors electrically connected with different ones of the global signal lines all are in conducting states in a period of time when the display panel is under the power failure condition.

8. A method for controlling a display panel, wherein the display panel comprises multiple gate lines and multiple data line crossing the multiple gate lines to form multiple pixel regions; multiple pixel electrodes in the multiple pixel regions; multiple first thin film transistors in the multiple pixel regions, wherein each of the multiple first thin film transistors comprises a gate, source and a drain, the gates of multiple first thin film transistors are connected to the gate lines, and the sources and the drains are connected to the data lines and the pixel electrodes respectively; multiple second thin film transistors, wherein each of the second thin film transistors is between and connecting two adjacent pixel electrodes arranged in a transverse direction; and multiple global signal lines, wherein each of the global signal lines is between two adjacent gate lines and electrically connected with more than one of the second thin film transistors in the transverse direction, wherein the method comprises:
the second thin film transistor is in a non-conducting state when the display panel is under normal operation, and the second thin film transistors electrically connected with different ones of the global signal lines all are in conducting states in a period of time when the display panel is under a power failure condition.

9. The method according to claim 8, wherein the second thin film transistor further comprises a source and a drain connected to the two adjacent pixel electrodes adjacent to the second thin film transistor respectively, the method further comprises: when the display panel is under normal operation, the global signal line applies a voltage gate low (VGL) to the gate of the second thin film transistor, and when the display panel is under the power failure condition caused by that the display panel shuts down unexpectedly, the global signal line applies a voltage gate high to the gate of the second thin film transistor for the period of time.

10. The method according to claim 9, wherein after the voltage that the global signal line applied to the gate of the second thin film transistor is voltage gate high and maintains for the period of time, the pixel regions in the display panel are at lower positive potentials with a same charge amount, at lower negative potentials with a same charge amount, or at a same ground potential (GND).

* * * * *